(12) United States Patent
Corcoran

(10) Patent No.: US 7,856,007 B2
(45) Date of Patent: *Dec. 21, 2010

(54) POWER LINE COMMUNICATION VOICE OVER IP SYSTEM AND METHOD

(75) Inventor: Kevin F. Corcoran, Middletown, MD (US)

(73) Assignee: Current Technologies, LLC, Germantown, MD (US)

( * ) Notice: Subject to any disclaimer, the term of this patent is extended or adjusted under 35 U.S.C. 154(b) by 1349 days.

This patent is subject to a terminal disclaimer.

(21) Appl. No.: 11/254,888

(22) Filed: Oct. 21, 2005

(65) Prior Publication Data

US 2007/0091800 A1    Apr. 26, 2007

(51) Int. Cl.
- *H04J 3/16* (2006.01)
- *H04L 12/56* (2006.01)
- *H04M 11/04* (2006.01)
- *G05B 11/01* (2006.01)

(52) U.S. Cl. .................. 370/349; 370/352; 370/395.42; 370/412; 370/466; 340/310.11; 340/310.16; 340/538; 340/538.15

(58) Field of Classification Search .................. 370/349, 370/352, 395.42, 412, 466; 340/310.11, 340/310.16, 538, 538.15

See application file for complete search history.

(56) References Cited

U.S. PATENT DOCUMENTS

| | | |
|---|---|---|
| 3,973,087 A | 8/1976 | Fong |
| 4,060,735 A | 11/1977 | Pascucci et al. |
| 4,479,033 A | 10/1984 | Brown et al. |
| 4,495,386 A | 1/1985 | Brown et al. |
| 4,638,298 A | 1/1987 | Spiro |
| 4,642,607 A | 2/1987 | Strom et al. |
| 5,319,634 A | 6/1994 | Bartholomew et al. |
| 5,625,751 A | 4/1997 | Brandwajn et al. |
| 5,675,576 A | 10/1997 | Kalampoukas et al. |

(Continued)

FOREIGN PATENT DOCUMENTS

DE    100 59 564 A1    9/2002

(Continued)

OTHER PUBLICATIONS

"EMETCON Automated Distribution System: Communications Guide", *Westinghouse ABB Power T & D Company Technical Manual* 42-6001A,, (Sep. 1989),1-55.

(Continued)

*Primary Examiner*—Alpus H Hsu
(74) *Attorney, Agent, or Firm*—Mel Barnes; Capital Legal Group, LLC

(57) ABSTRACT

A power line communication system communicating over a medium voltage power line including a VoIP endpoint that transmits voice data and requests to establish a voice connection to a medium voltage (MV) access device is provided. The medium voltage access device may determine a response to the request, allocate voice data packets a higher priority than general data packets, and transmit the data packets over the MV power line according to their priority. The MV access device may provide one or more voice over internet protocol (VoIP) switch functions and, in response to the requests, grant or deny the requests based, for example, on the number of established voice connections.

44 Claims, 8 Drawing Sheets

U.S. PATENT DOCUMENTS

| | | | |
|---|---|---|---|
| 5,774,526 A | 6/1998 | Propp et al. | |
| 6,040,759 A | 3/2000 | Sanderson | |
| 6,151,330 A | 11/2000 | Liberman | |
| 6,160,795 A | 12/2000 | Hosemann | |
| 6,185,221 B1 | 2/2001 | Aybay | |
| 6,281,784 B1 | 8/2001 | Redgate et al. | |
| 6,404,773 B1 | 6/2002 | Williams et al. | |
| 6,452,482 B1 | 9/2002 | Cern | |
| 6,480,510 B1 | 11/2002 | Binder | |
| 6,584,122 B1* | 6/2003 | Matthews et al. | 370/493 |
| 6,611,134 B2 | 8/2003 | Chung | |
| 6,624,532 B1 | 9/2003 | Davidow et al. | |
| 6,668,058 B2 | 12/2003 | Grimes | |
| 6,731,630 B1* | 5/2004 | Schuster et al. | 370/356 |
| 6,757,248 B1 | 6/2004 | Li et al. | |
| 6,854,059 B2 | 2/2005 | Gardner | |
| 6,885,674 B2* | 4/2005 | Hunt et al. | 370/420 |
| 6,892,243 B1* | 5/2005 | Skarpness | 709/234 |
| 6,965,302 B2* | 11/2005 | Mollenkopf et al. | 370/475 |
| 6,965,303 B2* | 11/2005 | Mollenkopf | 370/485 |
| 6,973,074 B1* | 12/2005 | Maranhao | 370/352 |
| 6,980,090 B2* | 12/2005 | Mollenkopf | 375/258 |
| 6,980,091 B2 | 12/2005 | White et al. | |
| 6,998,962 B2* | 2/2006 | Cope et al. | 370/351 |
| 7,031,317 B2 | 4/2006 | Negishi et al. | |
| 7,042,351 B2 | 5/2006 | Kline | |
| 7,064,654 B2* | 6/2006 | Berkman et al. | 340/310.11 |
| 7,136,936 B2 | 11/2006 | Chan et al. | |
| 7,142,094 B1 | 11/2006 | Davidow et al. | |
| 7,173,938 B1 | 2/2007 | Davidow | |
| 7,209,473 B1* | 4/2007 | Mohaban et al. | 370/352 |
| 7,321,591 B2 | 1/2008 | Daniel et al. | |
| 7,333,435 B2 | 2/2008 | Gerkis | |
| 7,342,883 B2 | 3/2008 | Szumilas | |
| 7,349,422 B2 | 3/2008 | Duong et al. | |
| 7,355,735 B1 | 4/2008 | Sivan et al. | |
| 7,492,873 B2* | 2/2009 | Giroti et al. | 379/88.17 |
| 7,586,899 B1* | 9/2009 | Mohaban et al. | 370/352 |
| 7,693,135 B2* | 4/2010 | Pershan | 370/352 |
| 7,734,909 B1* | 6/2010 | Roush et al. | 713/154 |
| 2001/0033566 A1 | 10/2001 | Grimes | |
| 2001/0046288 A1 | 11/2001 | Grimes | |
| 2002/0015387 A1 | 2/2002 | Houh | |
| 2002/0048368 A1 | 4/2002 | Gardner | |
| 2003/0067910 A1 | 4/2003 | Razazian et al. | |
| 2003/0129978 A1 | 7/2003 | Akiyama et al. | |
| 2003/0184433 A1 | 10/2003 | Zalitzky et al. | |
| 2003/0227373 A1 | 12/2003 | Lou et al. | |
| 2004/0001438 A1 | 1/2004 | Aretz | |
| 2004/0001499 A1 | 1/2004 | Patella et al. | |
| 2004/0037317 A1* | 2/2004 | Zalitzky et al. | 370/466 |
| 2004/0056734 A1 | 3/2004 | Davidow | |
| 2004/0059963 A1 | 3/2004 | Simonnet et al. | |
| 2004/0070912 A1 | 4/2004 | Kopp | |
| 2004/0075535 A1 | 4/2004 | Propp et al. | |
| 2004/0107299 A1* | 6/2004 | Lee et al. | 709/249 |
| 2004/0153564 A1* | 8/2004 | Lakkakorpi | 709/232 |
| 2004/0160990 A1 | 8/2004 | Logvinov et al. | |
| 2004/0174851 A1 | 9/2004 | Zalitzky et al. | |
| 2004/0223617 A1 | 11/2004 | Corcoran et al. | |
| 2004/0233928 A1 | 11/2004 | Pozsgay | |
| 2005/0063422 A1 | 3/2005 | Lazar et al. | |
| 2005/0076148 A1 | 4/2005 | Chan et al. | |
| 2005/0076149 A1 | 4/2005 | McKown et al. | |
| 2005/0143083 A1 | 6/2005 | Kwon et al. | |
| 2005/0169296 A1 | 8/2005 | Katar et al. | |
| 2005/0200459 A1 | 9/2005 | White, II | |
| 2005/0212688 A1 | 9/2005 | Chung | |
| 2006/0002189 A1 | 1/2006 | Berkman | |
| 2006/0034330 A1 | 2/2006 | Iwamura | |
| 2006/0049693 A1 | 3/2006 | Abraham et al. | |
| 2006/0146866 A1 | 7/2006 | Horvath et al. | |
| 2006/0176832 A1 | 8/2006 | Miceli | |
| 2007/0002771 A1 | 1/2007 | Berkman et al. | |
| 2007/0002772 A1 | 1/2007 | Berkman et al. | |
| 2007/0025244 A1 | 2/2007 | Ayyagari et al. | |
| 2007/0053352 A1 | 3/2007 | Corcoran | |
| 2007/0091800 A1 | 4/2007 | Corcoran | |
| 2007/0133552 A1* | 6/2007 | Kubo et al. | 370/395.2 |
| 2007/0291907 A1 | 12/2007 | Corcoran | |
| 2009/0097408 A1 | 4/2009 | Corcoran | |

FOREIGN PATENT DOCUMENTS

| | | |
|---|---|---|
| DE | 100 48 348 C2 | 11/2002 |
| DE | 101 47 916 C1 | 5/2003 |
| DE | 101 47 915 C1 | 6/2003 |
| EP | 0 822 721 A2 | 2/1998 |
| EP | 0 822 721 A3 | 2/1998 |
| EP | 1 021 866 B1 | 10/2002 |
| EP | 1 251 646 A2 | 10/2002 |
| GB | 1 548 652 | 7/1979 |
| GB | 2 335 335 A | 9/1999 |
| WO | WO-84/01481 A1 | 4/1984 |
| WO | WO-02/37712 A1 | 5/2002 |
| WO | WO-03/009083 A2 | 1/2003 |
| WO | WO-03/009083 A3 | 1/2003 |
| WO | WO-03/010896 A1 | 2/2003 |
| WO | WO-03/030396 A2 | 4/2003 |

OTHER PUBLICATIONS

"HomePlug 1.01 Specification", *HomePlug Powerline Alliance*, (Dec. 1, 2001),1-39.

"HomePlug Initital Draft Medium Interface Specification" *HomePlug Powerline Alliance*, (May 19, 2000),1-109.

"HomePlug Initital Draft Medium Interface Specification", *HomePlug Powerline Alliance*, (Jul. 27, 2000),1-109.

"HomePlug Powerline Alliance,", *HomePlug 0.5 Draft Medium Interface Specification,*, (Nov. 28, 2000),1-133.

Chen, Y-F , et al., "Baseband Transceiver Design of a 128-Kbps Power-Line Modem for Household Applications", *IEEE Transactions on Power Delivery*, (2002),338-344.

Gutzwiller, F W., et al., "Homenet: A Control Network for Consumer Applications", *IEEE Transactions on Consumer Electronics*, (Aug. 1983),297-304.

Kim, W-O , et al., "A Control Network Architecture Based on EIA-709.1 Protocol for Power Line Data Communications", *IEEE Transactions on Consumer Electronics*, (2002),650-655.

Lokken, G , et al., "The Proposed Wisconsin Eectric Power Company Load Management System Using Power Line Carrier Over Distribution Lines" *1976 National Telecommunications Conference, IEEE*, (1976),2.2-12.2-3.

Onunga, J , et al., "Distribution Line Communications Using CSMA Access Control with Priority Acknowledgements", *IEEE Transactions on Power Delivery*, (Apr. 1989),878-886.

Yoshitoshi, M , et al., "Proposed Interface Specifications for Home Bus", *IEEE Transactions on Consumer Electronics*, (Aug. 1986),550-557.

\* cited by examiner

POWER LINE COMMUNICATION VOICE OVER IP SYSTEM AND METHOD

FIELD OF THE INVENTION

The present invention generally relates to communications over a power distribution system and more particularly, to the implementation of a voice over internet protocol (VoIP) telephone system.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, IP network service providers, and the like.

In one example PLCS, a backhaul point forms the gateway between the power line and conventional telecommunications medium and communicates with a plurality of downstream communication devices such as transformer bypass devices. The backhaul point and its plurality of communication devices (and their associated user devices) form a PLCS subnet. The backhaul point and its plurality of communication devices (and their associated user devices) form a PLCS subnet. In some systems, a power line repeater may be added to the power line between the backhaul point and its communications devices.

As the use of the internet becomes more and more prevalent, it has been used to transmit voice data. Initially, software was developed to allow users at two different computers connected over the internet to talk to one another using internet protocol (IP) packets. This service was often of poor quality as the voice data was subject to latency. Subsequently, interfaces between the IP network and the standard phone network were developed to allow phone calls initiated from a computer to be routed onto the public switched telephone network (PSTN) and also for calls initiated on the PSTN to be routed to a computer. Such systems have been referred to voice over IP (VoIP).

VoIP endpoints have been developed that connect directly to a high-speed IP network connection and allow for VoIP telephone service without using a computer. A VoIP endpoint is a hardware and/or software function that adapts and packetizes analog or digital telephony signals (including video telephone telephony signals) and call supervision data for transmission to and from an IP network. The IP network may include the internet or a dedicated network, such as for example, a network that provides dedicated bandwidth to a user. There a numerous examples of VoIP endpoints, for example, analog telephone adaptor (ATA), IP telephones, cordless IP telephones, WiFi (i.e., IEEE 802.11) telephone, VoIP gateways, integrated access devices (IAD), IP private branch exchanges (PBX), video telephones, softphones, or gaming consoles. The ATA typically digitizes the analog voice signal, creates voice data packets of the digitized voice data, and transmits the voice data packets to the IP network. An IP phone typically integrates an ATA and a telephone. A cordless IP phone may integrate an ATA and a cordless telephone. A WiFi phone typically integrates an ATA and a telephone and sends VoIP packets to an IP network using the WiFi standard. A VoIP gateway may convert analog voice or digital voice signals into VoIP packets. An IAD may comprise a router with analog or digital voice ports and built-in CODECs to packetize voice inputs. An IP PBX may integrate a PBX and CODECS to packetize voice. A softphone may comprise a software program that uses a microphone and speakers (or a headset) to implement a CODEC and packetization and then to transmit and receive the VoIP packets over an IP network. A gaming console may include a voice headset and integrated voice packetization and allows gamers to talk to each other over an IP network.

FIG. 1 shows an example of a prior art VoIP system. A VoIP endpoint 110 connects to a high-speed IP network interface device 120. The high-speed IP network interface device 120 connects to the IP network 130. A VoIP switch 140 may also connect to the IP network 130. A PSTN gateway 150 connects the IP network 130 to the PSTN 160. The PSTN 150 is connected to analog phones 100. In general, any two devices endpoint devices (e.g., phone 100, VoIP endpoint 110) may call and receive calls from any other device. Thus, it is possible for a first VoIP endpoint 110 to make calls to and from other VoIP endpoints 110 (either on the PLCS or other IP networks), cell phones, computer systems with interactive voice response systems, voice enhanced gaming systems, etc.

To initiate a call a user picks up a phone at the VoIP endpoint 110, and the VoIP endpoint 110 generates an analog dial tone. Note that other types of call initiation may be used in a VoIP system such as, for example, initiating a call from a network server to two users. In this example, when the user dials a number, the VoIP endpoint 110 detects the digit tones and determines the number being dialed. The VoIP endpoint 110 produces a data packet containing the phone number being dialed and sends the data packet to a VoIP switch 140. The VoIP switch 140 determines whether the phone number dialed is on the same VoIP network. If it is, the VoIP switch 140 passes the call to the IP address of the VoIP endpoint 110 associated with the phone number that was dialed. If the destination endpoint is not locally known to the VoIP switch 140, the VoIP switch 140 typically will forward the call request and call routing information to another VoIP switch or to the PSTN 160 via a PSTN gateway device 150. In this event, the PSTN 160 utilizes global network of switches and databases to route calls to any publicly registered telephone number. If the destination phone is on the PSTN 160, the PSTN gateway 150 passes the voice data packets onto the PSTN 160 for delivery to the phone called as if the call originated from another phone on the PSTN 160. The voice packets from the user receiving the call travel in the reverse direction back to the caller. Also, either the VoIP end point 110 or the VoIP switch 140 may also perform other call control operations such as call transfer, multi-party conferencing, etc.

The VoIP endpoint 110 may provide the interface between a standard analog phone and a high-speed interface device. The VoIP endpoint 110 also may provide typical telephone indication signals such as dial tone, ring tone, and busy signal. Further, when the VoIP endpoint 110 is an ATA, it may generate a ring signal to cause an analog phone to ring when a call is received. The VoIP endpoint 110 may digitize an analog voice signal using one of many standard voice CODECs. The resulting voice packets are sent to an IP address as determined as described above. Once the call is established, the VoIP endpoint 110 converts the voice packets received into an analog signal for the user.

The high-speed IP network interface device 120 connects the ATA 110 to the IP network 130. For example, in a digital subscriber line (DSL) system, the IP network interface device 120 may comprise a DSL modem, and in a cable system, the IP network interface device 120 may comprise a cable modem.

The VoIP switch 140 connected to the IP network as described above helps to set up and route phone calls. Multiple VoIP switches 140 may be used to perform load balancing of call requests, to perform different call control operations, and/or to segregate responsibility for groupings of VoIP endpoints 110. Depending on the call control protocol used, the VoIP switch 140 may receive all of the voice data traffic and route it accordingly. Otherwise, the VoIP switch 140 may provide an IP address to the VoIP endpoint 110 identifying where to send voice data packets for the call.

The PSTN gateway 150 provides an interface between the P network 130 and the PSTN 160. The PSTN gateway 150 may have an IP address so that voice packets may be sent to it. Those voice packets may then be repackaged as necessary and passed onto the PSTN 160. Also, the PSTN gateway 150 may convert the packets from one encoding scheme to another as needed. Also, voice data traffic for a user of a VoIP system that the PSTN gateway 150 receives from the PSTN 160 is then sent to an IP address so that the voice packets can be passed to the VoIP endpoint 110 corresponding to the number being called. While only one PSTN gateway 150 is shown in this example, multiple PSTN gateways 150 spread out geographically may be connected to the IP network 130.

Users of the PSTN have come to expect a high quality of service (QOS) in their phone service. Achieving a QOS that is similar to that of the standard PSTN is one of the challenges for VoIP telephone service providers. Packet latency is a significant challenge in achieving high QOS in a VoIP telephone system. If the voice packets are delayed while traversing the IP network, the delay becomes noticeable to the users. Talk over between the users results as is the case with satellite telephone links. In order to achieve a desired packet latency, a latency budget is set for the various parts of the VoIP telephone system. The IP network was designed to carry data from on point to another. The various data packets in a data stream may follow various paths between two points. If the packets arrive out of order or are delayed, they can be buffered and then reordered. Also, a lost packet may be resent. Because of the variability of data traffic on the IP network, the latency of data packets on the IP network is highly variable. For typical data traffic latency of seconds may be acceptable. This is unacceptable for voice traffic. The latency of packets traveling on the IP network 130 must be limited and is typically specified. Also, the amount of latency in the VoIP system may be managed to provide different levels of QOS for the VoIP telephone service. Additionally, to deliver high quality voice service, packet loss and jitter must also be limited.

A user of a VoIP service uses an VoIP endpoint 110 to establish and communicate over a connection. For home users, such IP network connections commonly use digital subscriber line (DSL) or DOCSIS cable connections. For business users, T1 and T3 lines have been used to provide high-speed IP network connections. Now that PLCS can deliver high-speed IP network connections, VoIP services may be provided using a PLCS system. Therefore there remains a need for a PLCS system that provides VoIP telephone service to users and that manages latency for voice traffic in order to provide different QOS levels for VoIP telephone service.

SUMMARY OF THE INVENTION

The present invention comprises a power line communication system for communicating over a medium voltage power line. In one embodiment a VoIP endpoint transmits voice data and requests to establish a voice connection to a medium voltage (MV) access device is provided. The medium voltage access device may determine a response to the request, allocate voice data packets a higher priority than general data packets, and transmit the data packets over the MV power line according to their priority. The MV access device may provide one or more voice over internet protocol (VoIP) switch functions and, in response to the requests, grant or deny the requests based, for example, on the number of established voice connections.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 2:
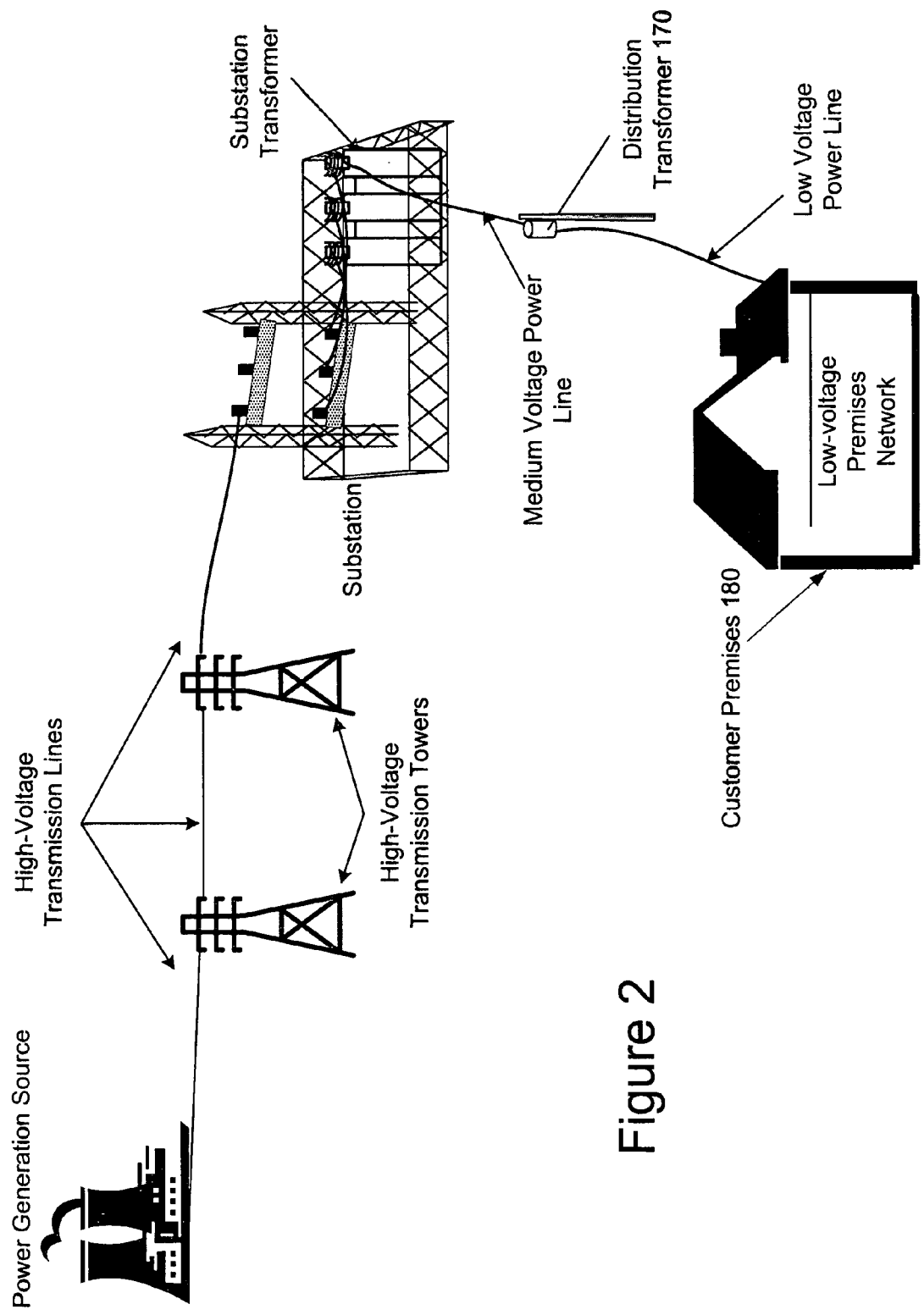
FIG. 2 is a diagram of an exemplary overhead power distribution system with which the present invention may be employed.

FIG. 2 illustrates an example power distribution system that includes components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase power signals to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level. The present inventions may be employed in overhead or underground PLCSs.

Power Line Communication System

The present invention relates to VoIP service on a PLCS network. Thus, the following brief description provides one example PLCS with which the present invention may be used. Other types of PLCS may be used with the present invention as well.

Figure 3:
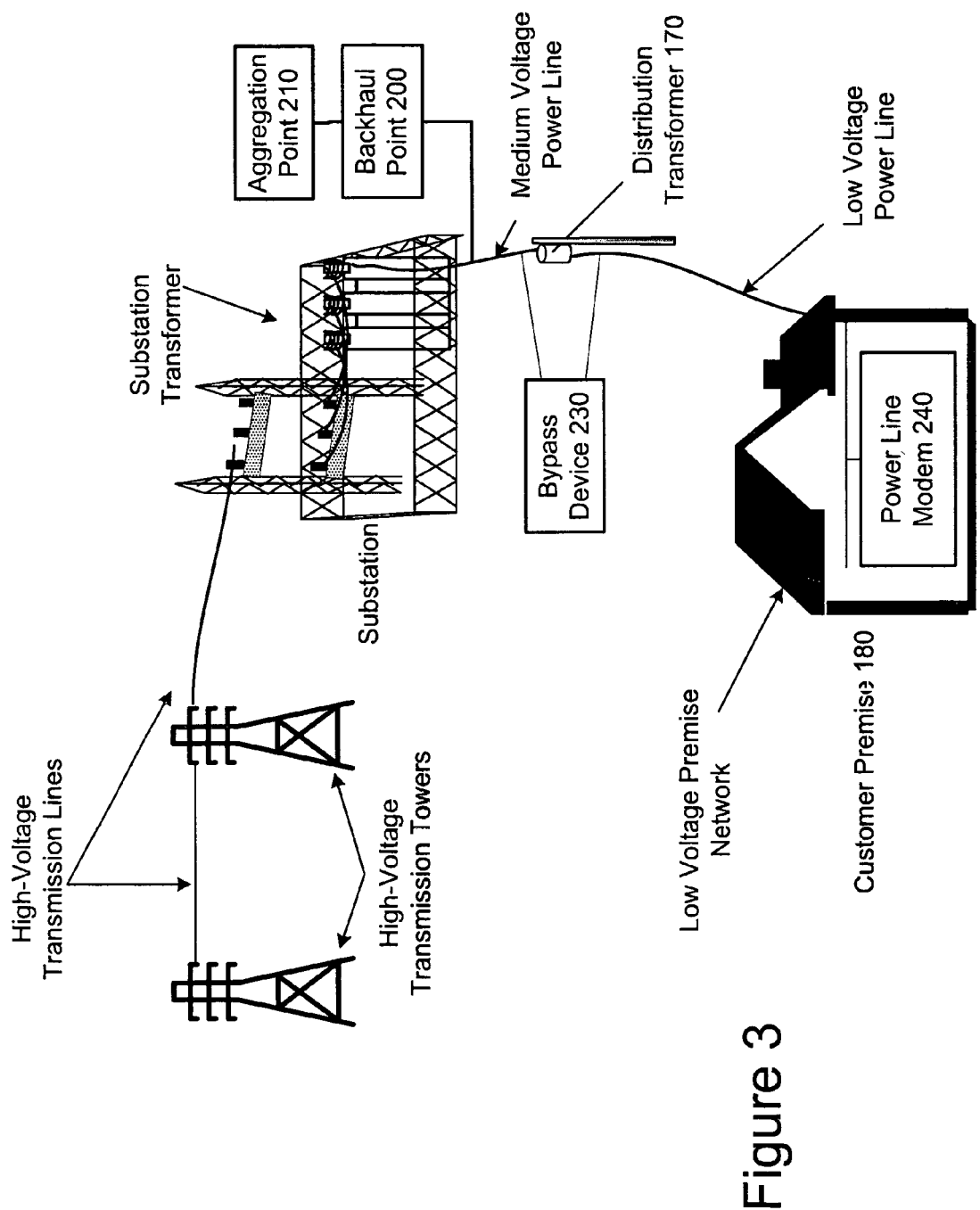
FIG. 3 illustrates an example implementation of a PLCS.

A portion of an example overhead PLCS is shown in FIG. 3 and includes one or more communications devices, which may be transformer bypass devices (bypass devices). In this illustration, only one communications device (bypass device 230) is depicted. However, in practice five, ten, or more communications devices may form part of a single PLCS subnet (the devices communicatively coupled to each other over the power lines). The communications device in this embodiment is a bypass device 230 that is the gateway between the LV power line subnet (i.e., the LV power lines and the devices that are communicatively coupled to the LV power lines) and the MV power line.

In this embodiment, the bypass device 230 provides communications services for the user devices, which may include security management, routing of IP network protocol (IP) packets, filtering data, access control, service level monitoring, service level management, signal processing and modulation/demodulation of signals transmitted over the power lines.

In other embodiments, a device coupled to the MV line may communicate with the customer premises 180 using a wireless connection (e.g., IEEE 802.11 or WiMAX), coaxial cable, twisted pair, Ethernet or any other suitable link. These connections to the customer premises 180 may then connect to a network within the customer premises, for example, an LV powerline network, a coaxial cable network, a fiber optic network, an Ethernet network, or a wireless network.

In this example PLCS, the PLCS subnet also includes a backhaul point 200. The backhaul point 200 is an interface and gateway between the power line and a non-power line telecommunications network. One or more backhaul points 200 typically are communicatively coupled to an aggregation point (AP) 210 that may be coupled to (or form part of) a point of presence (POP) to the IP network. The backhaul point 200 may be connected to the AP 210 using any available mechanism, including fiber optic conductors, T-carrier, Synchronous Optical Network (SONET), or wireless techniques. Thus, the backhaul point 200 includes a transceiver suited for communicating through the non-power line telecommunications medium (hereinafter the "backhaul link"). As used herein, the devices coupled to the MV power line and LV power line comprise a MV power line subnet.

The AP 210 may include an Internet Protocol (IP) network data packet router (hereinafter to include any of a router, switch, or bridge) and may be directly connected to an IP network backbone thereby providing access to the IP network (and be a POP). Alternatively, the AP 210 may be connected to a POP 220, which provides access to the IP network, or other communication network. The AP 210 or the POP 220 provide a network interface between the PLCS and the IP network 130. Depending on the configuration of the PLCS, a plurality of APs 210 may be connected to a POP 220 which provides IP network access. The POP 220 (or AP 210 as the case may be) may route voice and data traffic to and from an IP network. The routing of packets in the IP network may be determined by any suitable means such as by including information in the data packets to determine whether a packet is voice. The IP network may handle voice and other data packets differently, so as to meet the latency requirements for voice packets.

In some PLCS embodiments, there may a distribution point (not shown) between the backhaul point 200 and the AP 210. The distribution point, which may comprise a router, may be coupled to a plurality of backhaul points 200 and provides routing functions between its backhaul points 200 and its AP 210. In one example embodiment, a plurality of backhaul points 200 are connected to each distribution point and each distribution point (of which there is a plurality) is coupled to the AP 210, which provides access to the IP network and other networks.

The PLCS also may include a power line server (PLS) (not shown in FIG. 3) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communication devices via the IP network. The PLS may provide an IP network identity to the network devices by assigning the devices (e.g., user devices, bypass devices 230, (e.g., the LV modems and MV modems of bypass devices), LV and MV repeaters, backhaul points 200, and AP 210) an IP address and storing the IP address and other device identifying information (e.g., the device's location, address, serial number, etc.) in its memory. In addition, the PLS may approve or deny user devices authorization requests, command status reports and measurements from the bypass devices, repeaters, and backhaul points, and provide application software upgrades to the communication devices (e.g., bypass devices, backhaul points, repeaters, and other devices). The PLS, by collecting electric power distribution information and interfacing with utilities' back-end computer systems may provide enhanced distribution services such as automated meter reading, outage detection, load balancing, distribution automation, Vol/Volt-Amp Reactance (Volt/VAr) management, and other similar functions. The PLS also may be connected to one or more APs and/or core routers directly or through the IP network and therefore can communicate with any of the bypass devices, repeaters, user devices, backhaul points and other network elements through the respective AP and/or core router. The PLS may also transmit subscriber information, such as whether voice data service is enabled for a user, the level of service for each data service for a user (e.g., for those data services having more than one level of service), address information (e.g., IP address and/or media access control (MAC) addresses for devices) of the subscribers, and other information.

At the user end of the PLCS, data flow originates from a user device, which provides the data to a power line modem (PLM), which is well-known in the art.

Various electrical circuits within the customer's premises distribute power and data signals within the customer premises. The customer draws power on demand by plugging a device into a power outlet. In a similar manner, the customer may plug the power line modem into a power outlet to digitally connect user devices to communicate data signals carried by the power wiring. The PLM 240 thus serves as an interface for user devices to access the PLCS. The PLM 240 can have a variety of interfaces for customer data appliances. For example, a PLM 240 can include a RJ-11 Plain Old Telephone Service (POTS) connector, an RS-232 connector, a USB connector, a 10 Base-T connector, RJ-45 connector, and the like. In this manner, a customer can connect a variety of user devices to the PLCS. Further, multiple PLMs 240 can be plugged into power outlets throughout the customer premises, with each PLM 240 communicating over the same wiring internal to the customer premises.

The PLM 240 may be connected to (or integrated into) any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLM 240 transmits the data received form the user device through the customer LV power line to a bypass device 230 and may provide data received from the LV power line to the user device. In addition, the functions of the PLM 240 may be integrated into a smart utility meter such as a gas meter, electric meter, water meter, or other utility meter to thereby provide automated meter reading (AMR).

The bypass device 230 typically transmits the data to the backhaul point 200, which, in turn, transmits the data to the AP 210. In some instances, a LV power line repeater or MV power line repeater may be used as well. The AP 210 then transmits the data to the appropriate destination (perhaps via a core router), which may be a network destination (such as an IP network address) in which case the packets are transmitted to, and pass through, numerous routers (herein routers are mean to include both network routers and switches) in order to arrive at the desired destination.

The backhaul point 200 may be coupled to each phase of the MV power line. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data coupling between the conductors. As a result, the backhaul point 200 may not need to be physically connected to all three phase conductors of the MV cable and transmission from the backhaul point 200 when coupled to one MV phase conductor will be received by the bypass devices 230 connected to the other MV phase conductors and vice versa. In some embodiments, however, which may include underground MV cables, it may be desirable to couple the backhaul point 200 to all of the available phase conductors.

A detailed description of an example PLCS, its components and features is provided in U.S. patent application Ser. No. 11/091,677 filed Mar. 28, 2005, issued as U.S. Pat. No. 7,224,272, entitled "Power Line Repeater System and Method," which is hereby incorporated by reference in its entirety. A detailed description of another example PLCS, its components and features is provided in U.S. patent application Ser. No. 10/973,493 filed Oct. 26, 2004, issued as U.S. Pat. No. 7,321,291, entitled "Power Line Communications System and Method of Operating the Same," which is hereby incorporated by reference in its entirety. The VoIP system and methods of the present invention may be used with networks as described in the above patent applications. which include both underground and overhead PLCS. Thus, the invention is not limited to a particular PLCS, PLCS architecture, backhaul link, topology, data types, data services, or application.

Figure 1:
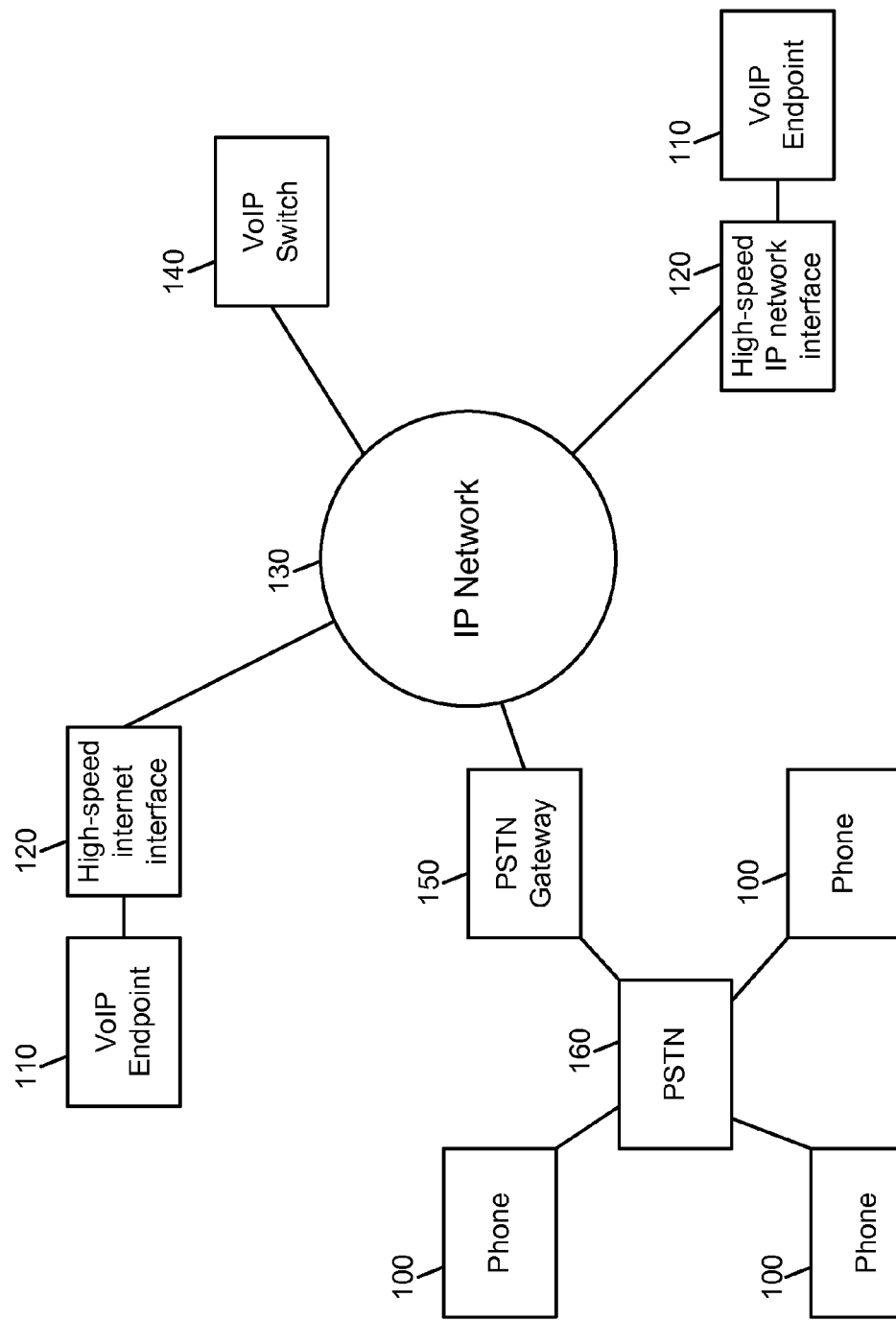
FIG. 1 shows a prior art VoIP system.
Figure 4:
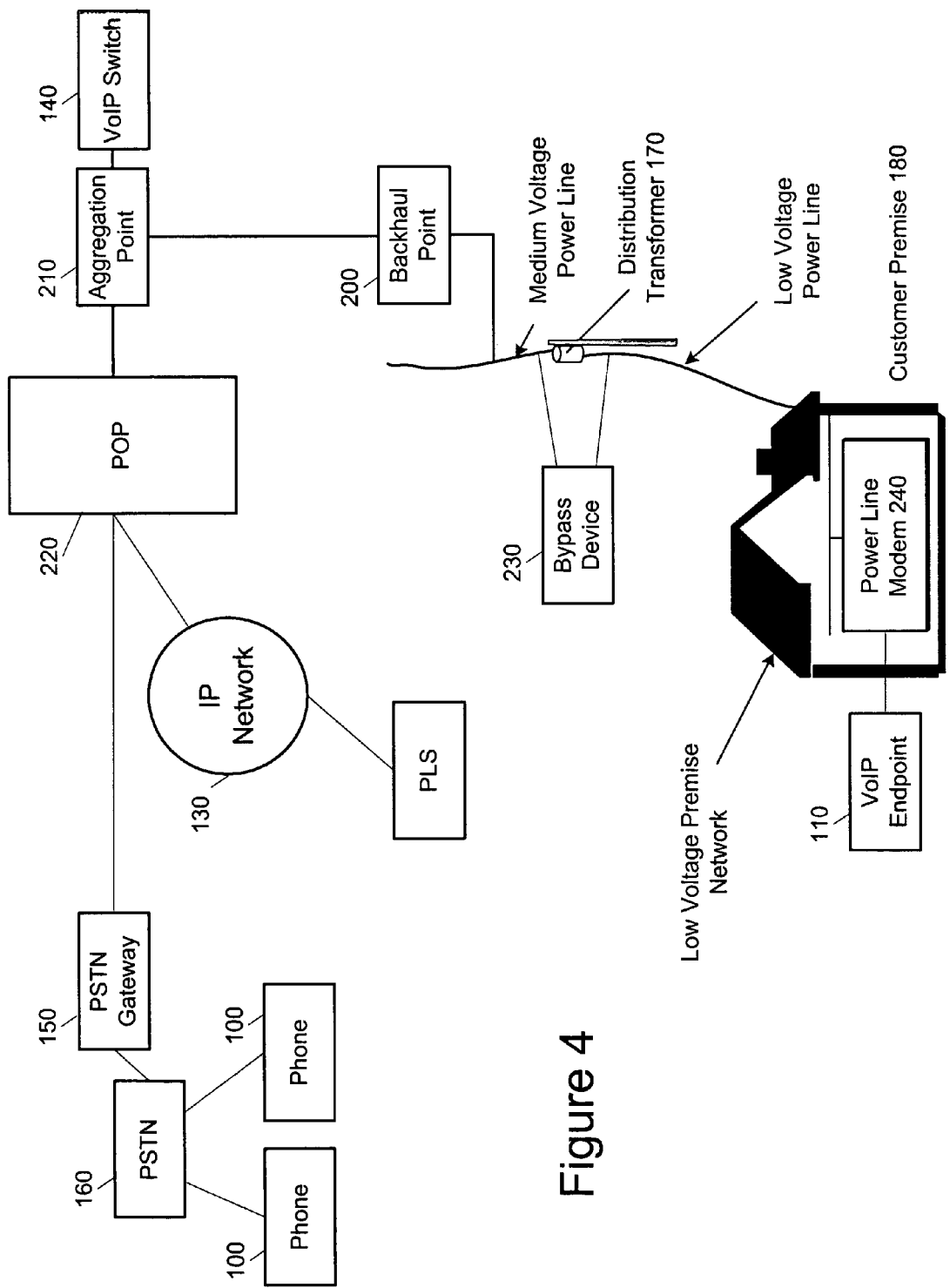
FIG. 4 illustrates an example of a VoIP implementation on a PLCS according to an embodiment of the present invention.

FIG. 4 shows an example of a VoIP implementation on a PLCS according to an embodiment of the present invention. FIG. 4 is based upon the PLCS shown in FIG. 4 with the additional system items needed to implement VoIP over the PLCS. Many of the additional items illustrated in FIG. 4 are similar to those described with respect to FIG. 1, and the items that are the similar have the same label. At the user end, a VoIP endpoint 110 is connected to the PLM 240. At the network end, the POP 220 may be connected to an IP network 130 (private or public). The IP network 130 may then be connected to the PSTN 160 through a PSTN gateway 150 and the PSTN 160 may be connected to phones 100 as shown. Also, a VoIP switch 140 may be connected to the AP 210. The VoIP switch 140 may alternatively be connected to the POP 220 or to the IP network 130.

In yet another embodiment of the present invention, one or more VoIP switch 140 functions may be implemented in the backhaul point 200 or bypass device 230 via software executing on a processor. One example implementation of such an embodiment is using a session initiation protocol (SIP) proxy service. Various commercial or open-source SIP software may be integrated into the backhaul point 200 and the bypass device 230. When a call is initiated by a VoIP endpoint 110, the call request may be sent to the SIP proxy server in the backhaul point 200 or the bypass device 230. The SIP proxy server determines how the call should be handled. For example the SIP proxy server implementing the VoIP switch functions may, for both incoming and outgoing calls, decide if the call request should be granted or denied; communicate with other proxy servers or databases to determine a path to the called destination; connect the VoIP endpoint 110 to media servers to play announcements (e.g., "please check the number and dial again"), generate the announcements, or retrieve from memory and transmit the announcements; handle call waiting events, call hold, three-way calling, etc.

In the present invention, the PLCS is part of the communication network through which the voice data packets pass. The PLM 240 provides the connection to the PLCS. The POP 220 provides the connection to the IP network 130. The voice traffic may then pass to a PSTN 160 where the voice traffic is carried to a phone 100 receiving the call. Also, the call may pass to other VoIP switches to provide a connection to other VoIP users or to other types of phone users such as mobile phone users.

The PLM 240 interfaces between a VoIP endpoint 110 or other data device like a computer and the low voltage power line. The PLM 240 receives an input data stream and then formats, modulates, and transmits the data in a signal suitable for transmission along the low voltage power line. Various data formats and modulation schemes may be used. For example, the HomePlug® Alliance has developed a standard for communicating over low voltage power lines. For convenience, the system will be described using the HomePlug standard, but other standards and schemes may be used for communication along the low voltage power line. Because multiple PLMs 240 may be interconnected by low voltage lines, the line is shared and data transmission needs to be managed to avoid transmission collisions. The HomePlug standard uses various mechanisms to manage transmission on the line in a distributed manner. Also, the HomePlug standard uses a four level priority scheme (CA0, CA1, CA2, and CA3) to allow higher priority data higher priority first access to the power line.

VoIP Over Powerline Communication System

As discussed above, voice data packet latency greatly affects the QOS of phone calls over a VoIP system. Therefore, one method of designing a VoIP network for a desired level of QOS includes determining the maximum latency allowable and a latency budget for various portions of the power line VoIP system. Such latency budget items may include, for example, budgets for the VoIP endpoint 110, the PLCS, the IP network 130, and the PSTN 160. For a high QOS VoIP service over a PLCS, the various causes of latency in the PLCS system need to be understood and minimized. It is also possible to provide various QOS levels for VoIP service. As the QOS level decreases the latency requirements become less stringent.

One way to reduce the voice data latency in the PLCS is to use data priority settings to increase the priority of voice data over other data. Such other data may be allocated a lower priority than voice data and may include system management data and general data, such as HTML pages, Email data, file downloading, and other such data. As discussed below, the priority settings allow voice data to be transmitted ahead of other lower priority data.

In typical communication networks, various links in the network use the same transmission formats and protocols. Therefore, data priority may be set upon entry into the network (e.g., at an upstream or downstream ingress point) and that priority value typically may remain with the data and have meaning throughout the network. In the VoIP system illustrated in FIG. 4, the VoIP data packets may be transmitted from the VoIP endpoint 110 to the PLM 240 as Ethernet data packets. From the PLM 240 through the bypass device 230 to the backhaul point 200, the VoIP packets may be transmitted using a Homeplug standard (e.g., 1.0 or AV)—although in an alternate embodiment the data signals may use a DOCSIS or other signal set. From the backhaul point 200 to the AP 210 may use Ethernet data packets again. From the AP 210 onto the IP network 130 an IP protocol may be used over a fiber using, for example, the SONET protocol. Each of these different protocols use different priority schemes and may even operate at different layers, i.e., layer 2 versus layer 3. Therefore, when high QOS VoIP service is desired, the VoIP packets must be identified and communicated with a higher priority across the network, which may include multiple sections employing different communications protocols and different priority schemes.

By way of illustration using the system of FIG. 4, voice data packets may be generated by the VoIP endpoint 110 and transmitted to the PLM 240 in Ethernet data packets. The voice data packets are IP packets and have a priority set according to the differentiated services (DiffServ) model as defined by IETF RFCs 2474 and 2475. High quality and high priority voice traffic may be tagged and handled though the IP network as expedited forwarding (EF) class of traffic (see IETF RFC 2498.) The voice data packets become part of the data payload of an Ethernet frame. Ethernet links do not process or recognize the priority assigned to IP data packets in its data frames, so the VoIP endpoint 110 may set the priority of the Ethernet frames carrying the voice packets to an appropriate level to achieve the desired voice QOS. The IEEE specification that defines Ethernet frames calls for 802.1p priority tagging of data packets. This tag is three bits long allowing for eight priority levels. IEEE guidelines recommend transmitting voice data packets with a priority level of six. Therefore, in one example embodiment the VoIP endpoint 110 may transmit the voice data packets over the Ethernet link with an 802.1p priority of six.

Continuing the example, the PLM 240 receives the Ethernet frames containing the voice data packets. In the present example, it is assumed that the PLM 240 uses a Homeplug® standard, but other standards may be used as well. The existing Homeplug standard (1.0) has four different priority levels for data, CA0, CA1, CA2, and CA3 with CA3 being the highest priority and CA1 being the default priority. The Homeplug® standard maps data with an 802.1p priority of six into a Homeplug® priority of CA3. In the present example, the voice packets are transmitted using the Homeplug® standard from the PLM 240 through the bypass device 230 to the backhaul point 200. The bypass device 230 and backhaul point 200 expedite the voice packets with a priority of CA3, a 802.1p tag of six, and/or a DiffServ tag of EF versus those with lower priority.

In the present example at the backhaul point 230, the voice data packets are received from the MV power line as Homeplug packets, but are transmitting as IP packets to the AP 210. Therefore, the voice data packets are received and transmitted with the DiffServ priority set by the VoIP endpoint 110. The bypass device 230 or backhaul point 230 may also check that IP data packets received with a Homeplug® priority of CA3 have a DiffServ priority of EF. If the packet does not have this priority, the bypass device 230 or backhaul point 200 resets the DiffServ priority of the voice data packets to EF. This may be necessary if the VoIP endpoint 110 does not have the capability of setting the DiffServ value to EF. In another embodiment, the backhaul point 200 may communicate with the AP 210 or POP 220 using Ethernet or some other type of communication link. In that case, the data must be tagged with an appropriate priority level for the link used in order to maintain high QOS for the voice packets.

In another embodiment, the user device's Internet Protocol (IP) address may be stored in memory of the bypass device and associated with a type of data. The address and data type information may be transmitted to the bypass device 230 from the PLS (e.g., via the MV power line) or from the user device or may be assigned to the device by the bypass device 230, backhaul point, or power line server. For example, the VoIP endpoint's IP address may be assigned by the PLS and transmitted to bypass device 230 along with information identifying the IP address as communicating voice data type. The information may be stored in the memory of the bypass device 239. The IP addresses of voice devices may be stored at all the ingress points to the PLC network and, therefore, may also be stored at the POP or aggregation point as well. Consequently, when the bypass device 230 receives a data packet, the processor in the bypass device may inspect the IP source address (for upstream data) or destination address (for downstream data) to determine the data type for processing. Similarly, when the POP receives a packet, it may inspect the IP destination address (for downstream data) or source address (for upstream data) to determine the data type for processing. Thus, in this embodiment, the ingress points to the PLCS (e.g., the bypass device 230 and POP) may have the IP addresses of all devices on their subnet stored therein (i.e., the LV subnet for the bypass devices 230 and the PLCS sub-network for the POP) as well as the type of data associated with that device (e.g., if the device is to be accorded a higher than default priority). Thus, the IP addresses of all the VoIP endpoints may be stored in their associated bypass devices 230. (Note that the user devices may be uniquely identified originally by their MAC address). The network devices (PLS and/or bypass devices) may store an association between the user device's MAC address(es) and the IP addresses that are assigned and subsequently uses the IP address as a key classification. In an alternate embodiment, the system may use the user device's MAC address (e.g. ATA MAC address) for classification. Similarly, the determination of whether the data packet is a management data packet may be accomplished by comparing the source IP address (for downstream data) with the IP address of those addresses known to transmit management packets (e.g., the IP address of the PLS) and by inspecting the destination IP address (for upstream data packets) to determine if the packet is being transmitted to device known to a receive management data packets. In other embodiments, other information may be used to identify the type of data packets such as a MAC addresses, which may be suitable when the user device includes an integrated PLM.

The above example illustrates the priority mapping that may be necessary in a PLCS system that carries voice data. As the voice data flows from the VoIP endpoint 110 to the PLM 240, onto the low voltage power line, through the bypass device 230, onto the medium voltage power line, and then into a backhaul point 200, different transmission schemes and data formats may be used. As a result different priority schemes may be found at different places throughout the system. Therefore, the priority values for the data must be mapped from one scheme to another as needed. Specifically, a MV access device (e.g., bypass device) may convert a first priority of the voice data received from a VoIP endpoint using a first communication protocol into a second priority of a second communication protocol used to transmit the voice data on the medium voltage power line. Thus, high-quality voice traffic typically needs to always be given a high priority value so that voice traffic is not delayed in the system.

The above example shows the need for mapping priority schemes as the voice packets move through the system. In other PLCS implementations other communication protocols may be used and priority mapping may be performed with these protocols to allow for the voice packets to be allocated a high priority.

It is also possible to offer a lower quality voice service to a subscriber. In such a case the VoIP endpoint 110 may generate packets and Ethernet frames with a priority level in accordance to the QOS level assigned to the subscriber. The same priority mapping described above may occur throughout the system. Such lower QOS voice offerings allow subscribers to subscribe to a lower cost service, while sacrificing QOS. Alternately, the bypass device 230 (e.g., for upstream data packets) and the backhaul point 200, AP 210, and/or POP 220 may set (or reset) the DiffServ tag (or other tags) based on the IP address of the VoIP endpoint 110 to a lower priority than used for higher quality voice data packets.

Typically, the various PLCS network elements (e.g., bypass devices 230, backhaul points 200, and repeaters) previously have had a single priority queue that receives incoming data packets. When traffic becomes heavy, the use of a single priority queue may result in increased latency and jitter that degrades VoIP performance. Thus, one problem with a single data packet queue is that even high priority data packets, such as voice data packets, may be lost if the single queue is full and cannot accept additional packets. One way to solve this problem is to have multiple data packet queues. Each type of data packet may be assigned to a data packet queue (which may or may not be different from the queue assigned to other types of data). In the case of priority tagging, each queue may correspond to a different priority or priority ranges. Typically, queues have a finite size, which is a measure of the amount of data that the queue can hold before being full (and can hold no more data). Thus, even if a low priority queue is full, incoming high priority data packets may arrive and be placed in a high priority data queue and will generally not be lost. Thus, the present invention may use priority queuing algorithms to overcome this shortcoming. Such queuing algorithms may include multiple queues, weighted priority queuing algorithms, fair queuing, deficit round robin, class based queuing, etc.

Figure 5:
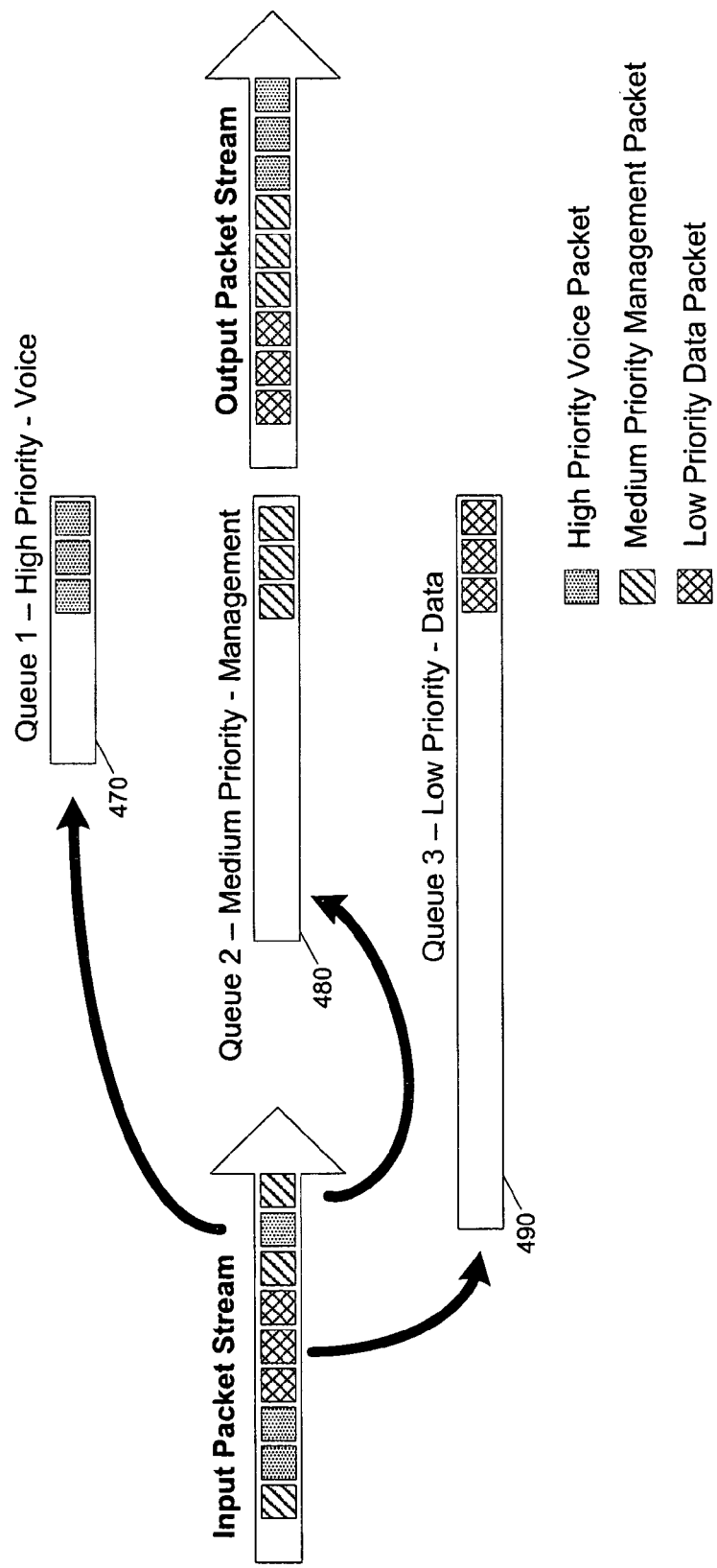
FIG. 5 illustrates an example of multiple data packet queues that they may be used to prioritize data according to an example embodiment of the present invention.

FIG. 5 illustrates multiple packet queues 470, 480, and 490. In this example, the input stream may include low priority data packets (for example, general data packets), medium priority data packets (for example, network management data packets), and high priority data packets (for example, voice data packets) as shown. Thus, in some embodiments each packets of type of data may be placed into different queues. Strict priority queuing, where the highest priority data is always transmitted next may be used, it has the drawback that it may prevent lower priority data packets from ever being transmitted. Therefore, one example embodiment employs weighted priority queuing. A set of weight factors limits the percentage of bandwidth that may be consumed by higher priority data types or classes of service. Thus, in one embodiment, a queue controller may be include a weight factor that controls transmission from the queues. As with the other functions described herein, the algorithm may be implemented via executable program code stored in memory an executable by the processor of the device handling the data packets. The weight factor is used to "promote" a lower priority queue when data packets have been present in that queue for a certain length of time, which may correspond to the number of data packets supplied to the output stream (for ease of discussion herein after referred to as "sent"). This promotion may be referred to as weight reversal. For a particular queue, its weight factor refers to the number of packets that will be transmitted from other queues while packets remain in that queue. When that number of packets has been transmitted, a weight reversal will occur, and a single packet will be transmitted from that queue. The count of the number of data packets sent from other queues will then be reset. The use of the weight factor ensures that transmission from a lower priority queue will not be completely or substantially stopped by the transmission of higher priority data traffic.

Figure 6:
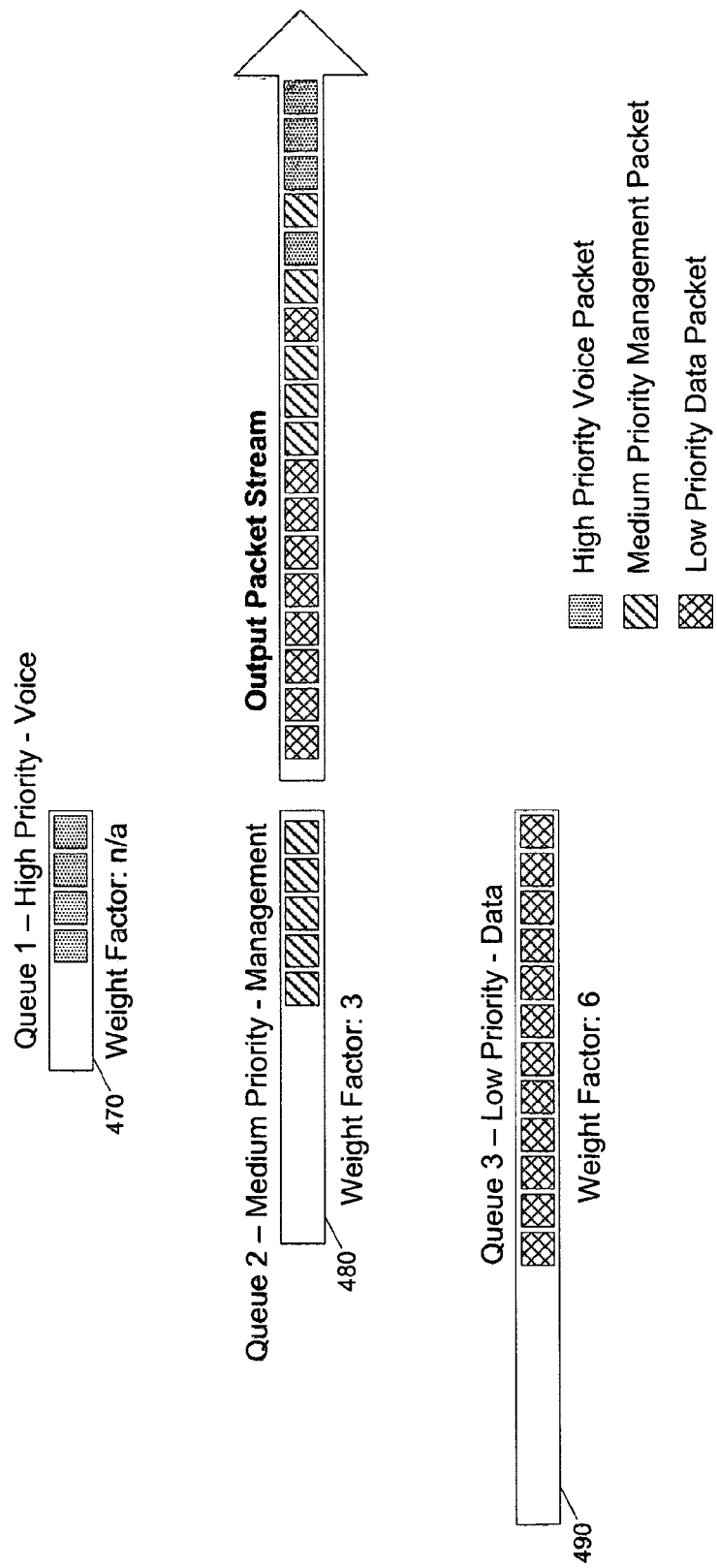
FIG. 6 illustrates an example of multiple data queues and associated weight factors according to an example embodiment of the present invention.

FIG. 6 shows an example of how the weight factors for the queues affect the output stream from the queues. Queue 1 is the high priority queue (e.g., for voice data); queue 2 is a medium priority queue and may handle management data and non-rate limited premium data packets; and queue 3 is the lowest priority queue and may handle general data packets. Queue 1 does not have a weight factor because it is the highest priority queue. Queue 2 has a weight factor of three, and queue 3 has a weight factor of six. Queue 1 is the highest priority queue and data packets from queue 1 are the first to be supplied to the output stream (sent). Once three data packets have been sent from queue 1, queue 2 which has a weight factor of three, now becomes the highest priority queue and sends a data packet. After that data packet is sent, the packet count for queue 2 is reset to zero. Now queue 1 is highest priority again and a queue 1 data packet is sent, which depletes the data packets in queue 1 and allows the next data packet to be sent from queue 2. After this data packet is sent, six data packets will have been sent in total, so queue 3 with a weight factor of six now becomes the highest priority queue and sends a data packet. The next three packets are sent from queue 2 depleting queue 2 and allowing queue 3 to send its next data packets.

Each queue or type or queue may be configured with a specific queue size appropriate for the assigned class of traffic. Default or general data packets continue to have large queues that minimize packet loss and maximize flexibility for variable network conditions. Given the real-time nature of voice traffic, substantially delayed voice packets are of little value and may preferably be dropped in some embodiments rather than consume queuing and bandwidth resources. Accordingly, the queue sizes for voice data packets and other similar data may be configured to be relatively small compared to some other queues. An example of different queue sizes is shown in FIG. 5. In some embodiments, enhanced power distribution service (EPDS) data (e.g., power usage data) and management data may have very large queues so that very little data is dropped.

The queue depths and weighting factors are set to achieve desired performance goals. For example, the queue sizes for a bypass device may be set to fifteen packets for queue 1, 100 packets for queue 2, and 1500 packets for queue 3. The weight factors may be three for queue 2 and six for queue 3. The highest priority queue typically does not have a weight factor. For a backhaul point (or POP) for example, the queue sizes may set to 25 packets for queue 1, 200 packets for queue 2, and 1500 packets for queue 3. The weight factors may be ten for queue 2 and twenty for queue 3. Further, these values may be set the same for all devices in a network, or may be set based upon the number of users of each type of service offered at each bypass device and each backhaul point of the PLC. In other instances, other devices, such as a MV or LV repeater, might not have multiple queues and may simply receive and transmit on a first in first out basis. More queues may be used additional types of data. Some examples would be streaming media data such as music, video, or gaming data. These other data types may have priorities that are higher or lower than voice data and may be implemented in the bypass device 230, the backhaul point 200, MV repeaters, the AP 210, an in-home router, a PLM, and/or the POP. Further, the queues may be organized based upon data type and data class within that data type. Also, queue selection may be simply based upon a session identification value, protocol application, or the data's source and/or destination address.

While one specific queuing algorithm is described above, other queuing algorithms may be used in the present invention as well. For additional information, on such algorithms, see the U.S. Patent Application entitled "Differentiated Services in a Power Line Communication System", filed Sep. 6, 2005, issued as U.S. Pat. No. 7,675,897, which is hereby fully incorporated herein by reference in its entirety.

In network configurations whereby voice traffic is assigned a high priority, it may be possible that a malicious user may spoof high priority voice traffic to improperly achieve high priority for data traffic. In order to prevent this from occurring, voice traffic may be rate limited. For example, the voice traffic may be limited to 8 to 100 kbps to allow for the use of typical voice CODECs while being a low enough rate to be of little value to a malicious data user. Additionally, the bypass device 230 or the backhaul point 200 may identify, classify, and retag upstream traffic from customer devices and ensure that the traffic forwarded through the network is valid authenticated and properly tagged class of service. Downstream traffic to the user devices may also be processed in a similar manner.

If a significant number of users of the PLCS subscribe to VoIP service, then there is the potential for data congestion if many of the users all attempt to place phone calls at the same time. Call admission control (CAC) limits the number of calls allowed at any given time over portions of the PLCS. CAC is a method by which a network control function may limit the number of simultaneous calls or sessions that may be initiated over a network. The CAC function monitors the number of calls or sessions present over the network and is an integrated component of call/session establishment and tear down for the appropriate service. In this embodiment, a CAC function may be implemented in the PLCS network to control the number of simultaneous telephony VoIP services supported at any time over the network. When VoIP services are supported using the session initiation protocol (SIP) signaling protocol, a CAC function may be implemented as an adjunct SIP proxy server function. This adjunct SIP proxy server is configured with a maximum number of SIP sessions to be supported, and may be consulted each time the network VoIP Switch (the same SIP Proxy Server or an alternate SIP Proxy Server) is requested to initiate or terminate a VoIP call.

A PLCS network is a hierarchical network whereby multiple LV networks are aggregated over a common MV network, multiple MV networks are aggregated over a common backhaul network, and multiple backhaul networks may be aggregated to a common POP. Accordingly, the number of subscribers served increases at each successive tier in the network. Additionally, the available network bandwidth over each network segment may not be consistent, nor is the ratio of subscribers to segment bandwidth always consistent. In such a network, a single defined maximum number of calls/sessions for an entire PLCS network does not yield an optimal CAC solution. A network-segmented CAC solution provides a more optimal solution for a PLCS network. A network-segmented CAC solution may provide a method to define individual maximum call/session limits per network segment and/or per network hierarchy; may identify the network segments used to establish calls/sessions to/from each service endpoint, and maintain the status of each network segment.

As an illustration, in one example PLCS network configuration, each LV network segment (i.e., the bypass device or other MV access device, any LV repeaters, and one or more user devices communicating with the MV access device via their modems and the low voltage power lines) may have capacity to support up to five simultaneous VoIP calls. Each MV power line network segment may have capacity to support up to ten simultaneous VoIP calls.

In this example, the backhaul connections from the MV power line to the POP 220 are considered sufficient to not require CAC limits. In such a network configuration, a network-segmented CAC solution maintains the status of each LV and MV network segment. Each time a VoIP call request is initiated for a VoIP endpoint 110 on the network, the network-segmented CAC function identifies the LV and MV segment used by the VoIP endpoint 110. If neither the LV segment limit nor the MV segment limit for the respective network segments has been reached, the call initiation is allowed to progress normally and the state of each segment is updated. Thus, the bypass device 230 (and backhaul point) may receive a request to establish a VoIP connection with/from a VoIP endpoint, determine whether the number of existing connections is less than the LV segment limit (the MV segment limit for the backhaul point) and, if so, grant the request or if the number of existing connections is already equal to the segment limit, deny the request. Thus, if either the LV or MV segment has reached the segment limit (five and ten respectively), the call request is denied and the calling party is informed by a standard network busy indication (e.g., a fast busy signal). In operation, if the LV segment limit has not been reached the bypass device 230 may transmit the request to the backhaul point for determination of whether the MV segment limit has been reached. If the MV segment limit has not been reached the backhaul point may transmit information of a grant of the request to the bypass device, which may transmit information of a grant of the request to the VoIP endpoint—thereby providing a distributed CAC function approach. Alternately, all requests may be transmitted to the VoIP switch or PLS, which may keep track of existing voice connections on the segments and respond to the request appropriately. In addition, or instead, the CAC function could implement a method to delay the denial of the call request for some number of seconds while waiting for an existing call to clear to allow the new call request to be granted. If a call does not clear in a predetermined time period, the call request may be denied.

Further, CAC with reconditioning may be implemented as an alternate method of managing excessive call requests over the PLCS network. A CAC with a reconditioning solution implements a similar method whereby the CAC function provides an indication that a maximum network capacity has been reached and the network cannot support the additional call/session request at its prescribed service level. The CAC function then instructs the network to allow the call/session to proceed reclassified as a lower priority service. If and when the network saturation conditions subside, the CAC function may instruct the network that voice data services given lower priority may be reestablished/reclassified at their originally requested higher service level.

As an example, in a network configuration with a prioritized, QOS-controlled VoIP service, if the maximum number of VoIP sessions has already been reached, additional call requests will be allowed to proceed, but all packets in the additional call sessions may be classified and tagged as a best-effort, standard data class of service rather than as a high priority VoIP class of service. CAC with reconditioning may optionally be used in conjunction with network-segmented CAC.

The CAC function may be implemented in the POP, AP, backhaul point 200 or at bypass device 230. The implementation of the CAC function, classification, prioritizing, and other functions described herein may be implemented in the POP, AP, backhaul point 200, repeater, bypass device 230, low voltage repeater, and/or user device (e.g., computer or VoIP endpoint) according to the design of the network as will be evident to one skilled in the art.

In one example embodiment, the PLS provides overall management of the PLCS and may be used to define and control QOS policies utilized by the network. The PLS may provide information to various network elements (typically, backhaul points 200 and bypass devices 230, but may include other devices such as APs, POPs, and MV and LV repeaters) in order to provide the appropriate services to users based upon their service subscription. The PLS may set the configurations, parameters, and priorities used by the network elements in accordance with the needs of the users attached to each network element. As the network changes, as users are added or deleted, as users add new devices, and/or as new services are provided, the PLS may provide the information to the affected network elements to adapt to the changes by transmitting such information to the network element over the PLCS (e.g., over the MV power lines for bypass devices 230 and repeaters). The network elements may then store and implement the new parameters and/or software application code.

As discussed, one example MV access device provides bi-directional communications around the distribution transformer to thereby provide a first communications path from the LV power line to the MV power line and a second path from the MV power line to the LV power line. For ease of understanding, the processing, and functional components of a communication path from the LV power line to the MV power line (the LV to MV path) will be described. The communication path from the MV power line to the LV power line (the MV to LV path) operates in the opposite direction in a similar manner and will not be described.

As will be evident to those skilled in the art, the two paths are logical paths. The LV to MV path and the MV to LV path may be separate physical electrical paths at certain functional blocks and may be the same physical path in other functional blocks. However, other embodiments of the present invention may provide for a completely, or substantially complete, separate physical path for the LV to MV and the MV to LV paths.

In the United States, the LV power line typically includes a neutral conductor and two conductors carrying current ("hot" conductors). In the United States, the two hot conductors typically carry about 120V alternating current (AC) at a frequency of 60 Hz and are 180 degrees out of phase with each other.

Figure 7:
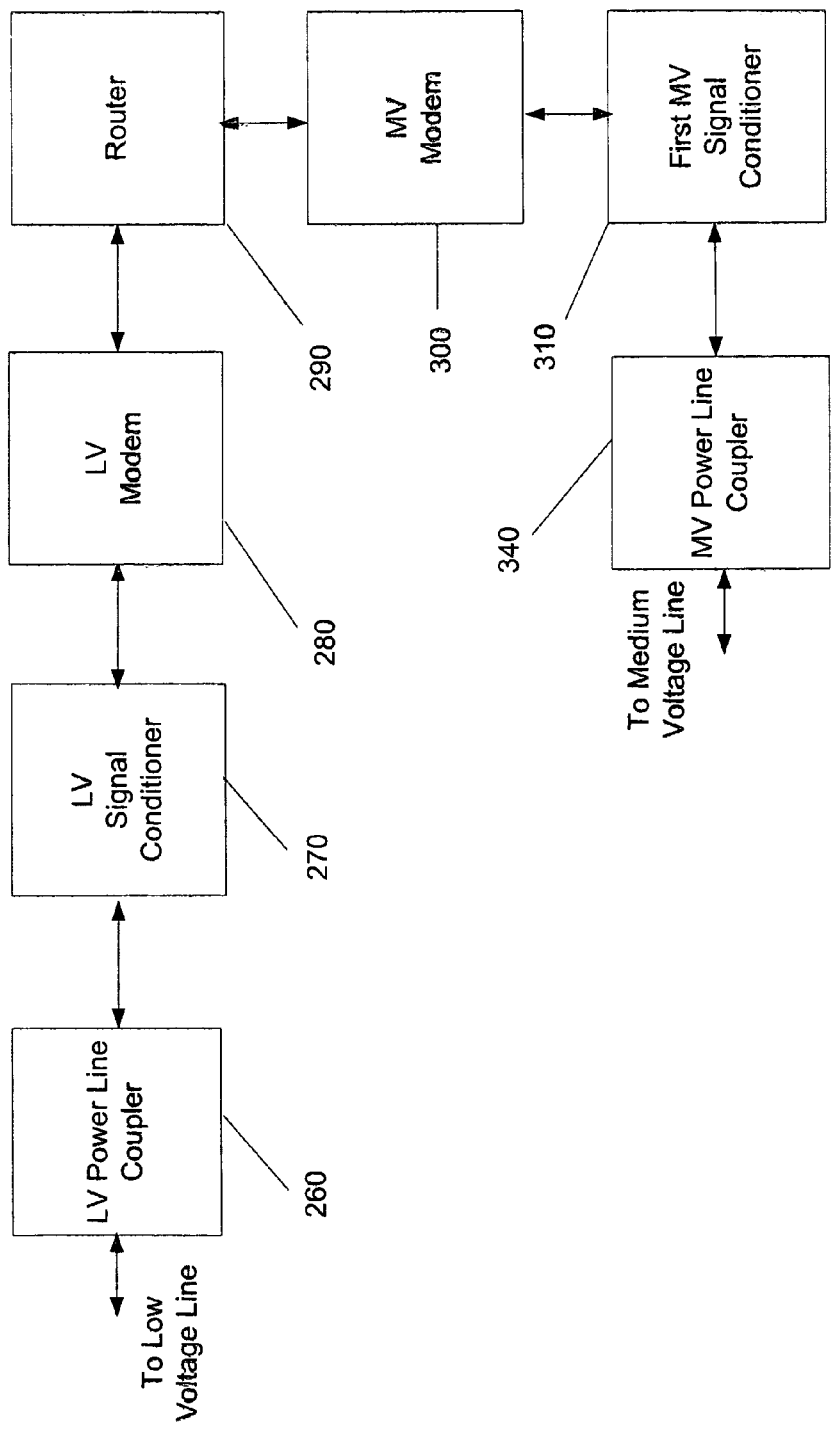
FIG. 7 illustrates an example embodiment of a medium voltage access device that may be used to implement the present invention.

The example bypass device 230 of FIG. 7 includes a LV power line coupler 260 that couples data to and from the LV power line. The coupler 260 also may couple power from the LV power line, which is used to power at least a portion of the bypass device 230.

In other embodiments, the LV coupler 260 may include a transducer and may be an inductive coupler such as a toroidal coupling transformer or a capacitive coupler, for coupling data to and/or from the LV power line.

In this embodiment, the signals entering the bypass device 230 are processed with conventional transient protection circuitry, which is well-known to those skilled in the art. The data signals in this embodiment "ride on" (i.e., are additive of) the low frequency power signal (the 120V 60 Hz voltage signal). Consequently, in this embodiment, it is desirable to remove the low frequency power signal, but to keep the data signals for processing, which is accomplished by the voltage translation circuitry. The voltage translation circuitry may include a high pass filter to remove the low frequency power signal and may also (or instead) include other conventional voltage translation circuitry.

Next, the data signals may be processed with impedance translation circuitry, which is well-known in the art. In this embodiment, it is desirable to substantially match the impedance of the LV power line. One method of matching the impedance of the LV power line is to separately terminate the bypass device LV conductors through a termination resistor to ground. The value of the termination resistor may be selected to match the characteristic impedance of the LV power line.

The bypass device 230 may include a battery backup for operating the bypass device 230 during power outages. Thus, a backup power system (which may include a battery) may allow the device to detect a power outage and communicate information relating to the outage to the utility company. The backup power system also may allow the bypass device 230 to communicate certain data packets during a power outage. For example, during an outage, the bypass device 230 may be programmed to communicate all voice data or only emergency voice transmissions (e.g., phone calls dialed to 911), which may require the controller to inspect the destination telephone numbers of one or more packets to determine the destination of the telephone call when there is a power outage.

Once the LV power line coupler 260 couples the signals (both power and data) from the LV power line, the data signals are provided to the LV signal conditioner 270. The LV signal condition 270 conditions the data signal using filtering, automatic gain control, and other signal processing to compensate for the characteristics of the LV power line. For example, the data signal may be filtered into different bands and processed.

The output of the LV signal conditioner 270 is supplied to the LV modem 280, which includes a modulator and demodulator. The LV modem 280 also may include one or more additional functional sub-modules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional sub-modules may be omitted in some embodiments, may be integrated into a modem integrated circuit (chip or chip set), or may be peripheral to a modem chip. In the present example embodiment, the LV modem 280 is formed, at least in part, by part number INT51X1, which is an integrated power line transceiver circuit incorporating most of the above-identified sub-modules, and which is manufactured by Intellon, Inc. of Ocala, Fla.

The incoming signal from the LV signal conditioner 270 may be supplied to the LV modem and demodulated. The LV modem 280 then provides decryption, source decoding, error decoding, channel decoding, and media access control (MAC) all of which are known in the art and, therefore, not explained in detail here.

With respect to MAC, however, the LV modem 280 may examine information in the packet to determine whether the packet should be ignored or passed to the router 310. For example, the modem 280 may compare the destination MAC address of the packet with the MAC address of the LV modem 280 (which is stored in the memory of the LV modem 280). If there is a match, the LV modem 280 removes the MAC header of the packet and passes the packet to the router 310. If there is not a match, the packet may be ignored.

The data packet from the LV modem 280 may be supplied to the router 310, which may form a part of the controller. The router 310 performs prioritization, filtering, packet routing, access control, and encryption.

As discussed above, in one embodiment, the router (or bridge) may inspect the IP source address (for upstream data packets) or IP destination address (for downstream data packets) and set priority tag(s) of the data packets accordingly. For example, if the source address of the upstream data packet corresponds to a VoIP endpoint, the router may set the IEEE 802.1p priority to 6 and set the DiffServ priority to EF. In a second embodiment, the DiffServ tag may have already been set (e.g., by the end user device) and the therefore the source and destination addresses may not need to be inspected. In either embodiment, the bypass device may provide classification, tagging (if necessary), queuing and the other functions described in conjunction with the above descriptions.

The router 310 of this example embodiment of the present invention uses a table (e.g., a routing table) and programmed routing rules stored in memory to determine the next destination of a data packet. The table is a collection of information and may include information relating to which interface (e.g., medium voltage or low voltage) leads to particular groups of addresses (such as the addresses of the user devices connected to the customer LV power lines), priorities for connections to be used, and rules for handling both routine and special cases of traffic (such as voice packets and/or control packets).

The router 310 will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line and the destination IP address corresponds to a user device connected to the LV power line), repeated on the MV line (e.g., if the bypass device 230 is acting as a repeater), or be ignored (e.g., if the address does not correspond to a user device connected to the LV power line or to the bypass device 230 itself).

As an example, the table may include information such as the IP addresses (and potentially the MAC addresses) of the user devices on the bypass device's LV subnet, the MAC addresses of the PLMs 240 on the bypass device's LV subnet, the MV subnet mask (which may include the MAC address and/or IP address of the bypass device's backhaul point 230), and the IP address of the LV modem 280 and MV modem 300. Based on the destination IP address of the packet (e.g., an IP address), the router may pass the packet to the MV modem 300 for transmission on the MV power line. Alternately, if the IP destination address of the packet matches the IP address of the bypass device 230, the bypass device 230 may process the packet as a request for data.

Similar to the LV modem 280, the MV modem 300 receives data from the router 310 and includes a modulator and demodulator. In addition, the MV modem 300 also may include one or more additional functional sub-modules such as an ADC, DAC, memory, source encoder/decoder, error encoder/decoder, channel encoder/decoder, MAC controller, encryption module, and decryption module. These functional sub-modules may be omitted in some embodiments, may be integrated into a modem integrated circuit (chip or chip set), or may be peripheral to a modem chip. In the present example embodiment, the MV modem 300 is formed, at least in part, by part number INT51X1, which is an integrated power line transceiver circuit incorporating most of the identified sub-modules and which is manufactured by Intellon, Inc. of Ocala, Fla.

The incoming signal from the router 310 (or controller) may be supplied to the MV modem 300, which provides MAC processing, for example, by adding a MAC header that includes the MAC address of the MV modem 300 as the source address and the MAC address of the backhaul point 230 (and in particular, the MAC address of the MV modem of the backhaul point) as the destination MAC address. In addition, the MV modem 300 also provides channel encoding, source encoding, error encoding, and encryption. The data may then be modulated and provided to the DAC to convert the digital data to an analog signal. Again, the input data packet may have an IEEE 802.1p priority (e.g., priority 6 for voice data packets) which may be converted by the modem to a HomePlug priority (CA0-CA3).

The modulated analog signal from MV modem 300 is provided to the MV signal conditioner 310, which may provide filtering (anti-alias, noise, and/or band pass filtering) and amplification. In addition, the MV signal conditioner 310 may provide frequency translation. In this embodiment, translation of the frequency is accomplished through the use of a local oscillator and a conversion mixer. This method and other methods of frequency translation are well known in the art and, therefore, not described in detail.

Data passing through the MV conditioner switch for transmission on the MV power line is supplied to the MV power line coupler 210, which may include impedance translation circuitry, transient suppression circuitry, and a coupling device. The coupling device couples the data onto the MV power line as a transmission.

The MV coupling device 340 may be inductive, capacitive, conductive, a combination thereof, or any suitable device for communicating data signals to and/or from the MV power line. One example of such a coupler is described in U.S. application Ser. No. 10/348,164, and entitled "Power Line Coupling Device and Method of Using the Same," filed Jan. 21, 2003, issued as U.S. Pat. No. 7,046,124, which is hereby incorporated by reference in its entirety.

Another example of such a suitable MV coupler is described in U.S. application Ser. No. 10/292,714, entitled "A Power Line Coupling Device and Method of Using the Same," filed Nov. 12, 2002, issued as U.S. Pat. No. 6,972,611, which is hereby incorporated by reference in its entirety. This coupler itself provides isolation by using the isolation provided by a standard underground residential distribution MV cable (although it may be used in an underground or overhead application).

Figure 8:
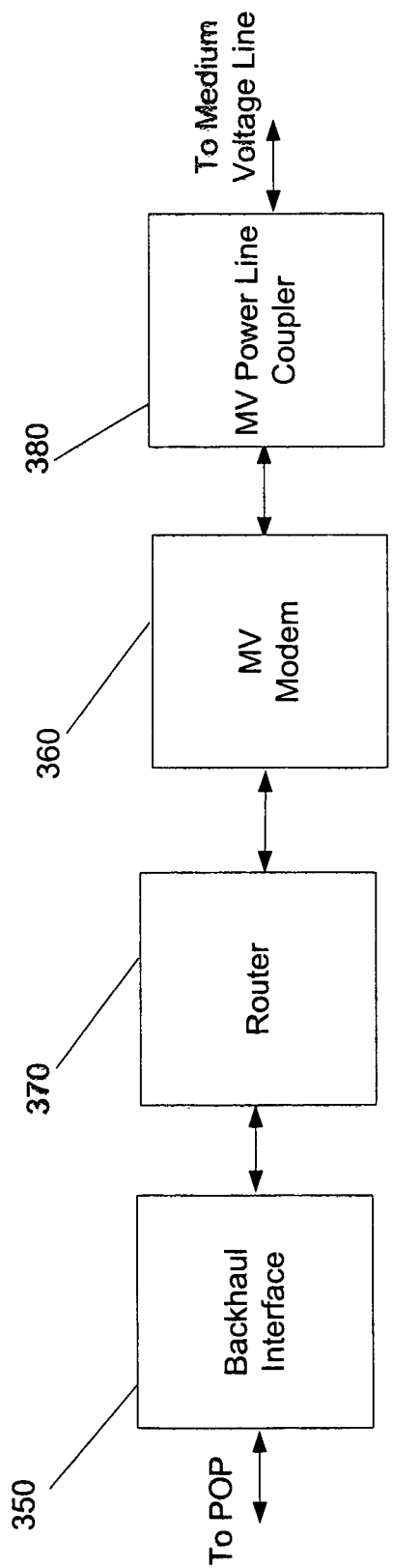
FIG. 8 illustrates an example embodiment of another medium voltage access device that may be used to implement the present invention.

FIG. 8 illustrates a block diagram of an example backhaul point. The backhaul point communicates with the outside world, typically the IP network, via the POP 220. The backhaul to the POP 220 may utilize any type of technology, such as for example, optical fiber, coaxial cable, copper, or a wireless link. The backhaul interface 350 may include a modem (e.g., a wireless or fiber optic transceiver) and connect the non-power line network to the MV modem 360 such as, for example, via a router 370. The MV modem 360 modulates/demodulates the data so that it may be transmitted over the MV cable. Data packets from the MV power line in this embodiment will have a HomePlug priority as supplied by the bypass device or MV repeater. The router (or bridge) of the backhaul point may classify, tag, and queue data packets (and perform many of the other functions described herein) according to (1) the source or destination address or (2) according to the DiffServ tag present and (a) HomePlug tag (for upstream data traffic) and (b) IEEE 802.1p priority tag (for downstream Ethernet data traffic). In some embodiments, the backhaul point may set the DiffServ tag based on the IP address or other information.

The MV coupler 380 is used to prevent the medium voltage power passing from the MV line to the rest of the backhaul point's circuits 350, 360, and 370, while allowing the communications signal to pass to/from the backhaul point 200 from/to the MV power line. This coupler may be the same as the MV coupler 340 described above. The above system employs time division multiplexing in a peer to peer architecture. Other embodiments may employ a master slave time division multiplexing protocol system. Additionally, the present invention is suitable for the power line communications systems installed on an underground power distribution system such as, for example, the example system incorporated herein by reference above. This example system employs frequency division multiplexing and amplification at the transformer communication nodes.

In an alternate embodiment, the intermediate communication devices (e.g., communication nodes located at the same location and performing substantially the same functionality as the backhaul point and transformer bypass devices described above) may be coupled to a conventional telecommunications medium such as a fiber optic cable, a coaxial cable, an Ethernet cable, a twisted pair, power line neutral conductor, a wireless link, or other non-energized power line communications medium instead of a MV power line. The conventional telecommunications medium may traverse substantially parallel to the power lines. Instead of an OFDM modem, a cable modem may be used for communications between the intermediate devices. In still another embodiment, instead of communicating over the LV power lines, the MV access device may communicate with user devices via a link that includes a wireless connection (e.g., IEEE 802.11 or WiMAX), coaxial cable, twisted pair, Ethernet or any other suitable link and therefore include a modem suitable for the link.

Thus, the present invention may be implemented via various embodiments. For downstream data, an ingress point, such as a POP or AP may receive packets, based on the destination IP address or other data, set tags in the data packets such as the DiffServ tag and/or the IEEE 802.1p priority tag. The backhaul point, bypass devices, and repeaters may prioritize and queue the data packets according to the DiffServ tag, the IEEE 802.1p priority tag or both. For upstream data, an ingress point such as a bypass device may similarly inspect IP addresses to set the DiffServ tag and/or the IEEE 802.1p priority tag, which will determine the priority and queuing of data packets by its upstream devices. In a second embodiment, the user device may be the ingress device for upstream data and set the DiffServ tag and/or the IEEE 802.1p priority tag based on configuration information stored therein instead of the bypass device.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended Those skilled in the art, having the benefit of the teachings of this specification, may affect numerous modifications thereto and changes may be made without departing from the scope and spirit of the invention.

What is claimed is:

1. A method of communicating voice data packets and general data packets wherein a communication device is coupled to a power line and provides communication services to one or more user devices, comprising:

receiving the data packets;
determining a data type for each of the data packets based on information in the data packet;
wherein a first data type comprises a voice data packet;
wherein another data type comprises a general data packet
tagging voice data packets with priority information of a first priority in accordance with a first communication protocol;
allocating voice data packets a higher priority than general data packets;
transmitting the tagged data packets over a communication path that includes the power line according to their allocated priority;
receiving the tagged data packets at a remote device; and
with the remote device, mapping the first priority of the first communication protocol of each voice data packet to a second priority associated with a second communication protocol.

2. The method of claim 1, wherein said determining the data type is based on an address of the data packets.

3. The method of claim 1, further comprising rate limiting at least some of the data packets.

4. The method of claim 3, wherein the rate limiting is based on the data type of the data packets.

5. The method of claim 3, wherein said rate limiting is based, at least in part, on subscriber information.

6. The method of claim 1, wherein receiving the data packets comprises receiving the data packets over a communication link that includes a low voltage power line.

7. The method of claim 1, wherein said allocating comprises:
placing each of the data packets in one of a plurality of queues; and
selecting a data packet for transmission from one of the plurality of data packet queues.

8. The method of claim 7, wherein placing the data packets is based upon said priority information of the data packets.

9. The method of claim 7, wherein at least some of the plurality of queues are different in size.

10. The method of claim 1, wherein receiving the data packets comprises receiving the data packets over a link that includes a wireless link.

11. The method of claim 1, further comprising implementing a session initiation protocol (SIP) proxy server in the remote device.

12. The method of claim 1, further comprising rate limiting at least some of the voice data packets.

13. The method of claim 1, further comprising:
receiving a request to establish a voice connection; and
determining a response to the request.

14. The method of claim 13, wherein determining a response comprises:
determining the number of existing voice connections; and
granting the request if the number of existing voice connections is less than a limit value.

15. The method of claim 14, further comprising denying the request if the number of existing voice connections is greater than the limit value.

16. The method of claim 13, further comprising denying the request if the number of existing voice connections has reached a limit value.

17. The method of claim 16, further comprising transmitting information of a denial of the request.

18. The method of claim 13, wherein the request comprises a request for a high quality voice connection and said response includes providing a low quality voice connection.

19. The method of claim 18, further comprising changing the low quality voice connection to a high quality voice connection.

20. The method of claim 19, wherein said changing occurs after a reduction in the number of preexisting voice connections.

21. The method of claim 1, further comprising providing one or more voice over internet protocol (VoIP) switch functions.

22. A method of communicating voice data over a power line, comprising:
receiving a plurality of data packets via a communication path that includes the power line and wherein the data packets include data originating from one or more downstream VoIP endpoints;
receiving a request to establish a VoIP connection via a communication path that includes the power line;
determining a number of existing VoIP connections;
granting the request if the number of existing VoIP connections is less than a limit value;
denying the request if the number of existing VoIP connections is equal to or greater than the limit value; and
mapping a first priority according to a first communication protocol associated with voice data packets to a second priority associated with a second communication protocol.

23. The method of claim 22, further comprising implementing a session initiation protocol proxy server for the one or more downstream VoIP endpoints.

24. The method of claim 22, further comprising providing one or more VoIP switch functions.

25. The method of claim 22, further comprising:
identifying at least some of the data packets as voice data packets and some as non-voice data packets;
placing at least some of the voice data packets in one of a plurality of queues; and
placing at least some of the non-voice data packets in a different one of the plurality of queues.

26. The method of claim 25, further comprising:
selecting a data packet for transmission from one of the plurality of queues; and
transmitting the data packets.

27. The method of claim 26, wherein at least some of the plurality of queues are different in size.

28. The method of claim 26, wherein the selecting is performed in accordance with a weight factor associated with at least some of the plurality of queues.

29. The method of claim 22, wherein receiving includes receiving the plurality of data packets via a wireless link.

30. The method of claim 22, further comprising rate limiting at least some of the voice data packets.

31. The method of claim 22, wherein the power line comprises a low voltage power line.

32. The method of claim 22, wherein the power line comprises a medium voltage power line.

33. The method of claim 22, wherein the power line comprises a low voltage power line and wherein a plurality of communications devices are coupled to a medium voltage (MV) power line and form part of a MV power line subnet and said receiving the request is performed at a computer system external to the MV power line subnet.

34. The method of claim 22, further comprising rate limiting at least some of the received data packets.

35. The method of claim 34, wherein the rate limiting is performed in accordance with subscriber information.

36. A method of communicating voice data packets and general data packets over a power line, comprising:
- receiving a plurality of data packets via a communication path that includes the power line;
- determining a data type for the data packets;
- wherein first data type comprises a voice data packet;
- wherein another data type comprises a general data packet;
- tagging voice data packets with priority information;
- receiving a request to establish a VoIP connection;
- determining a response to the request in accordance with a limit value;
- transmitting the response to the request;
- allocating voice data packets a higher priority than general data packets;
- mapping a first priority according to a first communication protocol associated with voice data packets to a second priority associated with a second communication protocol; and
- transmitting the tagged data packets according to their priority.

37. The method of claim 36, wherein determining a response comprises:
- granting the request if the number of existing VoIP connections is less than the limit value; and
- denying the request if the number of existing VoIP connections is greater than the limit value.

38. The method of claim 36, further comprising:
- identifying at least some of the data packets as voice data packets;
- wherein said allocating comprises:
- placing at least some of the voice data packets in one of a plurality of queues;
- selecting a data packet for transmission from one of the plurality of data packet queues; and
- wherein said transmitting the data packets is performed in accordance with said selecting.

39. The method of claim 38, wherein at least some of the plurality of queues are different in size.

40. The method of claim 38, wherein the selecting is performed in accordance with a weight factor associated with at least some of the plurality of queues.

41. The method of claim 36, further comprising rate limiting at least some of the received data packets.

42. The method of claim 36, wherein the request comprises a request for a high quality voice connection and said response includes providing a low quality voice connection.

43. The method of claim 42, further comprising changing the low quality voice connection to a high quality voice connection.

44. The method of claim 43, wherein said changing occurs after a reduction in the number of established voice connections.

* * * * *